Feb. 26, 1924.
E. FRANKLAND
1,485,023
MOTOR VEHICLE AXLE
Filed March 9, 1922
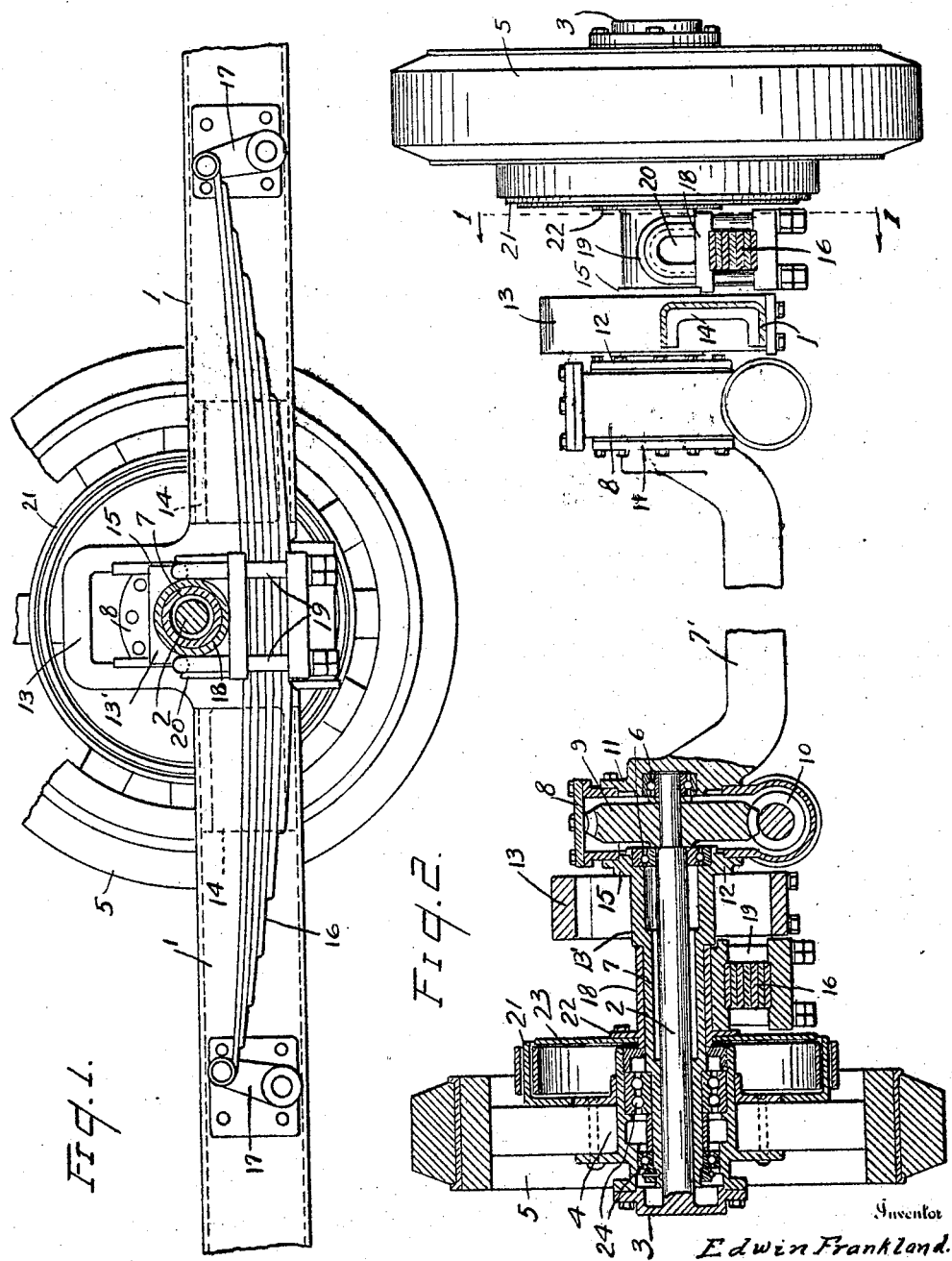
Inventor
Edwin Frankland.

Patented Feb. 26, 1924.

1,485,023

UNITED STATES PATENT OFFICE.

EDWIN FRANKLAND, OF PONTIAC, MICHIGAN.

MOTOR-VEHICLE AXLE.

Application filed March 9, 1922. Serial No. 542,443.

*To all whom it may concern:*

Be it known that I, EDWIN FRANKLAND, a subject of the King of Great Britain, residing at Pontiac, in the county of Oakland and State of Michigan, have invented a new and useful Motor-Vehicle Axle, of which the following is a specification.

This invention relates to vehicle axles and particularly to axles of heavy duty vehicles equipped with twin drive mechanisms for the wheels thereof.

It is the object of the invention to provide a twin drive axle having tubular end portions forming housings for live or driven axles, and having its central portion connected to said tubular housings by casings for gears through which said live axles are driven.

A preferred embodiment of the invention is hereinafter described and illustrated in the accompanying drawings, wherein, Fig. 1 is a section taken on line 1—1 of Fig. 2, and transversely cutting an axle having the improved construction.

Fig. 2 is a rear view of said axle in partial section.

In these views the reference character 1 designates the frame of a truck or other heavy duty vehicle, said frame being formed of the customary channel beams. A pair of alined live axles 2 are formed at their outer ends with flanges 3 which are bolted or otherwise secured to the hubs 4 of drive wheels 5. The axles 2 are journaled in bearings 6 housed in the tubular end portions 7 of a dead axle having the downwardly offset center portion 7'. The parts 7 and 7' of said axle are rigidly connected by casings 8 enclosing driving gears for the live axles. Preferably these gears comprise a worm-wheel 9 fast upon the inner end of each live axle, and a worm 10 arranged to drive said gear. To adapt the portions 7 and 7' of the dead axle to be rigidly secured to the casings 8, the ends of the part 7' may be flanged as indicated at 11 and the inner end of the parts 7 may also be formed with flanges 12, and said flanges being bolted or otherwise secured to the casings. 13 designates vertically slotted guide members rigidly secured within the frame and receiving the inner ends of the tubular axle portions 7, which portions are formed with rectangular bearing blocks 13' for sliding engagement with the vertical sides of said guide members. Preferably said guide members are formed with oppositely extending bracket arms 14 which are fitted into adjoining ends of the channel shaped side sills of the frame and welded thereto. Shoulders 15 are formed on said bearing blocks 13' to laterally engage the guides 13 and prevent relative movement of the frame and axle transversely of the former. To support the frame upon the axle, leaf springs 16 are shackled terminally to the frame as indicated at 17, and are centrally carried by saddle sleeves 18 which embrace the extensions 7 of the axle. U-shaped bolts 19 embracing arched lugs 20 integrally formed upon said sleeves clamp said springs 16 thereon.

Said sleeves engage the axle extensions just outside the guides 13, between the latter and the brake drums 21 of the wheels 5, and are provided with flanges 22 to which are secured closures 23 for said drums, the wheels 5 being journaled upon bearings 24 at the outer ends of the axle extensions 7.

It will be observed that by the described construction a strong, compact and readily accessible grouping and assembly of the parts is effected, enabling the application of twin or independent drive to the tractive wheels; that the draft thrust of the axle is exerted directly upon the frame through the engagement of the axle with the guideways of said frame leaving the springs free to effectively absorb vertically acting stresses, and that a relatively low positioning of the frame with the axle and a comparatively high and uniform road clearance is secured throughout the distance between the tractive wheels.

What I claim is:

An axle comprising a dead axle member having tubular end portions with flanged inner ends and a center portion with flanged ends, live axle members arranged respectively within said end portions, independent gear trains for driving said live axle members, and housings for said gear trains to which said flanges of the dead axle member are secured, said housings connecting the tubular and middle portions of said member.

In testimony whereof I sign this specification.

EDWIN FRANKLAND.